United States Patent [19]

Okuzawa

[11] Patent Number: 4,675,768
[45] Date of Patent: * Jun. 23, 1987

[54] FLEXIBLE MAGNETIC DISK HAVING AN EMBOSSED CIRCULAR HOLE

[75] Inventor: Yasutoshi Okuzawa, Odawara, Japan

[73] Assignee: Fuji Photo Film Co., Ltd., Japan

[*] Notice: The portion of the term of this patent subsequent to Jun. 11, 2002 has been disclaimed.

[21] Appl. No.: 591,877

[22] Filed: Mar. 21, 1984

[30] Foreign Application Priority Data

Mar. 29, 1983 [JP] Japan .................. 58-45535[U]

[51] Int. Cl.⁴ .................. G11B 23/03; G11B 3/70; G11B 5/84; G11B 7/26
[52] U.S. Cl. .................. 360/133; 369/280
[58] Field of Search .................. 360/132, 133, 137; 369/280

[56] References Cited

U.S. PATENT DOCUMENTS

| | | | |
|---|---|---|---|
| 4,375,658 | 3/1983 | Martinelli | 360/133 |
| 4,414,597 | 11/1983 | Cornin | 360/133 |
| 4,523,246 | 6/1985 | Okuzawa | 360/132 |

FOREIGN PATENT DOCUMENTS

| | | | |
|---|---|---|---|
| 2155292 | 11/1979 | Fed. Rep. of Germany | 360/135 |
| 52-12804 | 1/1977 | Japan | 360/133 |
| 57-130237 | 12/1982 | Japan | 360/133 |

*Primary Examiner*—Robert S. Tupper
*Assistant Examiner*—Melissa J. Koval
*Attorney, Agent, or Firm*—Gerald J. Ferguson, Jr.; Michael P. Hoffman; Ronni S. Malamud

[57] ABSTRACT

A flexible magnetic disk comprises a jacket and a flexible magnetic disk sheet housed in the jacket. The flexible magnetic disk sheet is provided at the center with a circular hole for engagement with a sheet positioning member of an information writing and read-out apparatus. The jacket has an aperture for exposing the circular hole of the flexible magnetic disk sheet. The peripheral edge portion of the circular hole which comes into contact with the sheet positioning member is embossed to decrease the coefficient of friction of the peripheral edge portion to 0.45 or less, so that the flexible magnetic disk sheet is correctly positioned by the sheet positioning member.

5 Claims, 8 Drawing Figures

FIG. IA 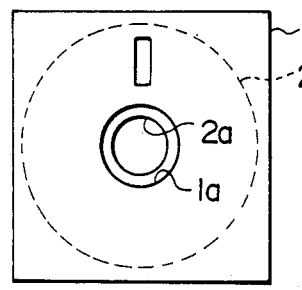
FIG. IB 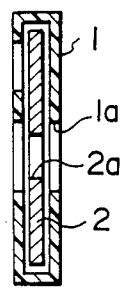

FLEXIBLE MAGNETIC DISK HAVING AN EMBOSSED CIRCULAR HOLE

BACKGROUND OF THE INVENTION

1. Field of the Invention

This invention relates to an improvement in a flexible magnetic disk.

2. Description of the Prior Art

Flexible magnetic disks comprising a jacket and a flexible magnetic disk sheet housed therein are commonly used for magnetic recording and reproducing. The jacket and the sheet have circular holes at the centers thereof for engagement with sheet positioning members of an information writing apparatus or an information read-out apparatus. Thus the sheet is rotated by a rotatable section of the sheet positioning members for magnetically recording information in the sheet or for magnetically reproducing information from the sheet. In the magnetic disk of this type, since the sheet is housed in the jacket in slightly spaced relation from the inner surfaces of the jacket, the position of the sheet sometimes comes to be displaced from the center of the jacket during storage, handling or carrying of the magnetic disk. When the magnetic disk is loaded into a writing apparatus or a read-out apparatus in this condition, the circular hole at the center of the sheet is positioned eccentrically with respect to the sheet positioning members (collet and rotatable section) of the apparatus. Thus the sheet is held in an eccentric position, and it becomes impossible to correctly write information into the sheet or to correctly read information out of the sheet.

FIG. 1A is a plan view showing an example of the flexible magnetic disk, and FIG. 1B is a sectional view of the flexible magnetic disk shown in FIG. 1A. The flexible magnetic disk comprises a rectangular jacket 1 having a circular aperture 1a in the center, and a flexible magnetic disk sheet 2 having a circular hole 2a in the center. The magnetic disk sheet 2 is rotatably housed in the jacket 1 so that the peripheral edge portion of the circular hole 2a is exposed within the circular aperture 1a of the jacket 1.

FIG. 2 is a partially sectional view showing the condition of loading the flexible magnetic disk between sheet positioning members in a writing apparatus or a read-out apparatus. FIG. 3 is a partially sectional view showing the condition of the flexible magnetic disk sheet of the flexible magnetic disk held in an eccentric position with respect to the sheet positioning members in a writing apparatus or a read-out apparatus. FIG. 4 is a partially sectional view showing the condition of the flexible magnetic disk sheet of the flexible magnetic disk correctly positioned by the sheet positioning members in a writing apparatus or a read-out apparatus.

As shown in FIG. 2, when the flexible magnetic disk is loaded into a writing apparatus or a read-out apparatus, a rotatable section 3 of the sheet positioning members is contacted with the magnetic disk sheet 2 from below, and a collet 4 of the sheet positioning members is moved down and fitted into a circular recess 3a of the rotatable section 3. However, the peripheral edge portion of the circular hole 2a of the sheet 2 is not always aligned with the peripheral edge portion of the circular recess 3a of the rotatable section 3, but instead is often displaced from the peripheral edge portion of the circular recess 3a. As shown in FIG. 3, when the collet 4 is moved down in this condition, a part of the peripheral edge portion of the circular hole 2a of the sheet 2 is sandwiched between the collet 4 and the peripheral edge portion of the circular recess 3a of the rotatable section 3. As a result, the sheet 2 is held eccentrically with respect to the rotatable section 3 and the collet 4, and rotated in this condition in the writing apparatus or in the read-out apparatus. Such positioning of the sheet 2 must be avoided since writing of information into the sheet 2 and read-out of information therefrom are not conducted correctly unless the sheet 2 is rotated with the center thereof exactly aligned with the rotation axis. Further, when the sheet 2 is rotated in the eccentrically held condition, the flatness of the sheet 2 is adversely affected, and the sheet 2 is subject to flapping motion during rotation. So that the sheet 2 can be correctly positioned on the peripheral edge portion of the circular recess 3a, as shown in FIG. 4, as the collet 4 is moved down, it is desirable that the coefficient of friction of the sheet 2 with respect to the rotatable section 3 and the collet 4 be low.

SUMMARY OF THE INVENTION

The primary object of the present invention is to provide a flexible magnetic disk which is always loaded at the correct position into an information writing apparatus or into an information read-out apparatus.

Another object of the present invention is to provide a flexible magnetic disk comprising a flexible magnetic disk sheet exhibiting a low coefficient of friction with respect to sheet positioning members of an information writing apparatus or an information read-out apparatus.

The specific object of the present invention is to provide a flexible magnetic disk comprising a flexible magnetic disk sheet exhibiting a high bending strength.

The flexible magnetic disk of the present invention comprises a flexible magnetic disk sheet having a circular hole at the center thereof, the peripheral edge portion of said circular hole which comes into contact with at least one sheet positioning member of an information writing apparatus or an information read-out apparatus being embossed so that the coefficient of friction of said peripheral edge portion of said circular hole is 0.45 or less.

By "coefficient of friction of said peripheral edge portion" is meant the coefficient of friction of the peripheral edge portion of the circular hole in the flexible magnetic disk sheet with respect to the (upper and lower) sheet positioning members of an information writing apparatus or an information read-out apparatus. For example, the peripheral edge portion of the circular hole in the sheet is embossed so that the coefficient of friction of the peripheral edge portion with respect to the upper sheet positioning member is 0.45 or less and the coefficient of friction thereof with respect to the lower sheet positioning member is 0.3 or less. In this case, the sheet is pushed by the slant surface of the upper sheet positioning member (i.e. the aforesaid collet) and smoothly moved from an eccentric position to the concentric position with respect to the lower sheet positioning member (i.e. the aforesaid rotatable section), as the collet is moved down from above the sheet for positioning the sheet in the writing apparatus or in the read-out apparatus. Thus the sheet can be correctly positioned in the apparatus. Further, by embossing the peripheral edge portion of the circular hole of the sheet, the bending strength of the sheet is improved, and the peripheral edge portion of the circular hole of the sheet becomes resistant to bending when the sheet is positioned by the collet. This also contributes to the prevention of deviation in position of the sheet when the sheet is positioned by the sheet positioning members of the apparatus.

The present invention will hereinbelow be described in further detail with reference to the accompanying drawings.

BRIEF DESCRIPTION OF THE DRAWINGS

FIG. 1A is a plan view showing an example of the flexible magnetic disk,

FIG. 1B is a sectional view showing the flexible magnetic disk of FIG. 1A,

DETAILED DESCRIPTION OF THE INVENTION

Figure 2:
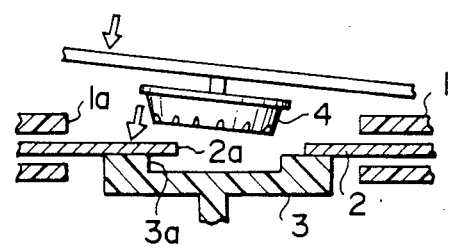
FIG. 2 is a partially sectional view showing the condition of loading the flexible magnetic disk between sheet positioning members in an information writing apparatus or an information read-out apparatus.
Figure 3:
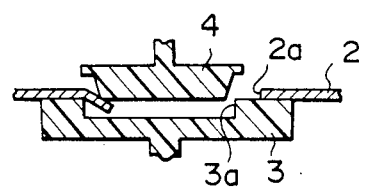
FIG. 3 is a partially sectional view showing the condition of the flexible magnetic disk sheet of the flexible magnetic disk held in an eccentric position with respect to the sheet positioning members in an information writing apparatus or an information read-out apparatus.
Figure 4:
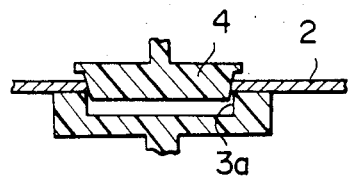
FIG. 4 is a partially sectional view showing the condition of the flexible magnetic disk sheet of the flexible magnetic disk correctly positioned by the sheet positioning members in an information writing apparatus or an information read-out apparatus.
Figure 5:
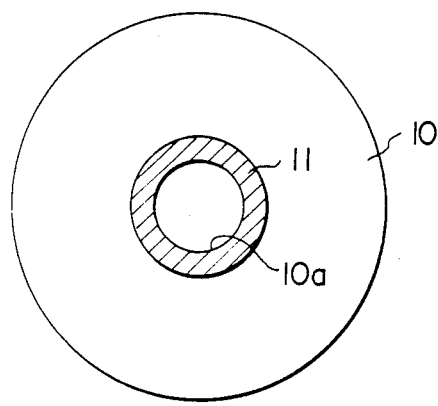
FIG. 5 is a plan view showing the flexible magnetic disk sheet portion of an embodiment of the flexible magnetic disk in accordance with the present invention.
Figure 6:
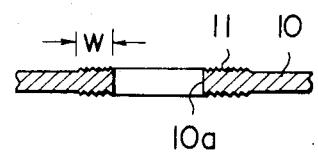
FIG. 6 is an enlarged sectional view showing the center portion of the flexible magnetic disk sheet of FIG. 5.

Referring to FIGS. 5 and 6, the flexible magnetic disk in accordance with the present invention comprises a flexible magnetic disk sheet 10 having a circular hole 10a at the center. One surface or both surfaces of the sheet 10 are embossed along the ring-like peripheral edge portion 11 of the circular hole 10a. By way of example, when the size of the sheet 10 is 8 inches (8×25.4 mm) or 5 inches (5×25.4 mm), the width W of the embossed portion 11 may be about 3 mm, and the height of the net-like or dot-like fine protrusions formed by embossing should preferably be within the range of about 0.01 mm to about 0.2 mm.

Figure 7:
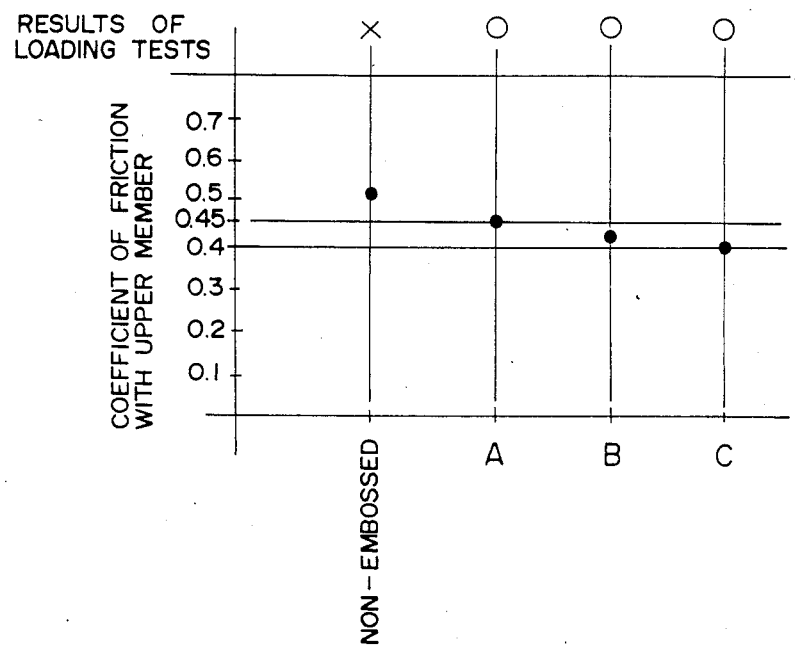
FIG. 7 is a graph showing the technical effects of the flexible magnetic disk in accordance with the present invention.

Tests conducted on the flexible magnetic disk constructed as described above in accordance with the present invention revealed that, when the coefficient of friction of the embossed portion 11 with restect to an upper sheet positioning member of a writing apparatus or a read-out apparatus was 0.45 or less, the flexible magnetic disk was correctly loaded into the apparatus even when the sheet 10 was off center at the initial stage of loading. FIG. 7 shows the results of the loading tests. In FIG. 7, A indicates the flexible magnetic disk comprising a sheet constructed as shown in FIGS. 5 and 6 wherein the emboss height is 10 $\mu$m. B and C indicate the flexible magnetic disks comprising the sheets constructed as shown in FIGS. 5 and 6 wherein the emboss heights are 30 $\mu$m and 50 $\mu$m, respectively. Also, the mark "o" indicates that the results of the loading tests were good, and the mark "x" indicates that the results of the loading tests were not good. The tests were conducted at a feed rate of the upper sheet positioning member (collet) and the flexible magnetic disk sheet of 0.8 mm/second, an applied load of 70 gram-weight, an ambient temperature of 23° C., and relative humidity of 70%.

As is clear from the foregoing and the test results shown in FIG. 7, the coefficient of friction ($\mu$ value) of the flexible magnetic disk sheet with respect to the upper sheet positioning member or a writing apparatus or a read-out apparatus should be decreased to 0.45 or less by embossing.

I claim:

1. A flexible magnetic disk comprising a jacket and a flexible magnetic disk sheet housed in said jacket, said flexible magnetic disk sheet being provided at the center thereof with a circular hole for loading into an information writing and read-out apparatus, said jacket being provided with an aperture for exposing said circular hole of said flexible magnetic disk sheet, wherein the improvement comprises embossing the peripheral edge portion of said circular hole which comes into contact with at least one sheet positioning member of said information writing and read-out apparatus, thereby decreasing the coefficient of friction of said peripheral edge portion of said circular hole.

2. A flexible magnetic disk as defined in claim 1 wherein the coefficient of friction of said peripheral edge portion of said circular hole is 0.45 or less.

3. A flexible magnetic disk as defined in claim 2 wherein the coefficient of friction of said peripheral edge portion of said circular hole with respect to an upper sheet positioning member of said information writing and read-out apparatus is 0.45 or less, and the coefficient of friction thereof with respect to a lower sheet positioning member of said apparatus is 0.3 or less.

4. A flexible magnetic disk as defined in claim 1 wherein the width of said embossed peripheral edge portion is about 3 mm.

5. A flexible magnetic disk as defined in claim 1 wherein the emboss height of said embossed peripheral edge portion is within the range of about 0.01 mm to 0.2 mm.

* * * * *